United States Patent [19]
Warrick

[11] Patent Number: 4,641,189
[45] Date of Patent: Feb. 3, 1987

[54] DIGITAL VERTICAL SYNC FILTER

[75] Inventor: Julian E. Warrick, Palatine, Ill.

[73] Assignee: Zenith Electronics Corporation, Glenview, Ill.

[21] Appl. No.: 540,740

[22] Filed: Oct. 11, 1983

[51] Int. Cl.[4] .............................................. H04N 5/10
[52] U.S. Cl. .................................... 358/154; 358/139; 328/111; 328/139
[58] Field of Search ............... 358/148, 153, 154, 139, 358/21 V; 328/111, 139

[56] References Cited

U.S. PATENT DOCUMENTS

4,214,270  7/1980  Morito ................................ 358/154
4,319,275  3/1982  Tanaka ................................ 358/154

Primary Examiner—James J. Groody
Assistant Examiner—Michael D. Parker

[57] ABSTRACT

The filter first looks in the composite sync signal for a pulse enduring at least 6 microseconds. In response to such a detection, it reconfigures to look for pulses which endure at least 12 microseconds and illustratively requires two 12-microsecond pulses in 4 horizontal lines of time which comprise a window which opens after the 6 microsecond detection. This window provides good noise immunity. If these conditions are met, it emits a drive signal for a counted duration and then reconfigures to prepare for the next field.

36 Claims, 4 Drawing Figures

DIGITAL VERTICAL SYNC FILTER

BACKGROUND OF THE INVENTION

The present invention relates to improvements in television vertical synchronizing filters.

In a typical video communication system it is necessary to synchronize the horizontal and vertical sweeps of the video signal so that the displayed picture of the receiver is an accurate reproduction of the picture originally transmitted. Normally, this is done by transmitting synchronizing (sync) signals corresponding to the appropriate horizontal and vertical periods on the video signal. These sync signals are typically combined in a composite sync signal which is superimposed on the transmitted video signal. Thus, in order to synchronize the display of the video signal at the receiver, one detects this signal and initiates the horizontal and vertical sweeps of the receiver display scan at the appropriate times.

The present invention concerns the detection of vertical sync signals in the composite sync signal and provides for the generation of a suitable drive pulse for synchronizing the receiver vertical scan circuitry when the vertical period is detected.

Traditionally, the vertical sync information has been extracted from the composite sync signal through the use of analog circuits requiring many relatively expensive parts to achieve the requisite circuit performance. However, even though costly, the analog circuits are particularly sensitive to a noisy circuit environment, sometimes causing inadequate performance and a poor quality picture at the receiver. This occurs when the television receiver is used in conjunction with devices such as video recorders which can subject the receiver to an extremely noisy electronic environment or output nonstandard sync signals. It is therefore desirable to incorporate a high level of noise immunity into the vertical sync circuit to avoid the false generation of vertical sync pulses during noisy circuit operation.

The present invention is concerned further with achieving a vertical sync filter implemented on an integrated circuit. An examination of the various digital up/down count systems shows that they use numerous gates. In a fully integrated circuit chip, the space required by those numerous gates becomes excessive. Consequently, the prior art up/down counting systems are not suitable in the environment in which the present invention is to be used and therefore do not meet the present objectives. It is desirable to minimize the IC gate count and external parts, which represents significant cost savings, while at the same time offering performance comparable to or better than existing analog filters.

Accordingly, it is a primary object of the invention to provide a digital vertical sync filter which performs as well as existing analog filters while minimizing both the number of external parts and integrated circuit gates.

It is a further object of the invention to provide comparable noise immunity within the normal operation of the latter to avoid false generation of vertical sync pulses.

It is still a further object of the invention to provide for the generation of a vertical sync pulse having very little variation in width.

BRIEF DESCRIPTION OF THE FIGURES

The features of the present invention which are believed to be novel are set forth with particularity in the appended claims. The invention, together with its objects and the advantages thereof, may best be understood by reference to the following detailed description taken in conjunction with the accompanying drawings of which:

DESCRIPTION OF THE PREFERRED EMBODIMENT

The digital vertical sync filter of the preferred embodiment extracts vertical sync information from positive composite sync and generates an integrated vertical sync pulse suitable for use as a vertical drive pulse. According to one feature of the invention, composite sync is sampled at a high rate to determine when vertical sync information is first received. A second feature of the invention continues to sample composite sync after vertical sync information is received to determine whether the first determination was due to true vertical sync information or was only the result of noisy conditions. Once it is determined that true vertical sync information has been detected, a circuit emits an integrated vertical sync pulse suitable for use as a vertical drive pulse and having accurately defined limits.

The digital vertical sync filter of the invention may have other applications but is particularly useful when used in conjunction with a video receiver in a video communication system utilizing a composite sync signal to provide both field and line synchronization for the video signal. Consequently, the invention will be described below in terms of use in that environment.

In a typical composite video signal, the video information is transmitted together with horizontal synchronizing pulses and horizontal blanking signals. The television receiver interprets this information and causes an electron beam in the television picture tube to scan the viewing area of the tube in a raster-like fashion. The horizontal synchronizing pulses cause the electron beam to return from one side of the viewing screen back to the other side, and the blanking pulses prevent any visible information from being created on the face of the picture tube during this horizontal retrace operation. Ultimately, the electron beam will reach the bottom portion of the picture tube, and it will become appropriate to return the electron beam to the top of the tube for a new vertical scan. The time when this is to occur is transmitted by commercial broadcast stations along with the video information. In the case of video games or other apparatus which use television receivers as a display, such apparatus provide the composite sync which causes the vertical retrace of the electron beam. This is done by means of a composite sync signal.

The NTSC has set forth particular standards for a composite sync signal, and the area of concern in the present invention centers around the vertical signals.

Figure 2:
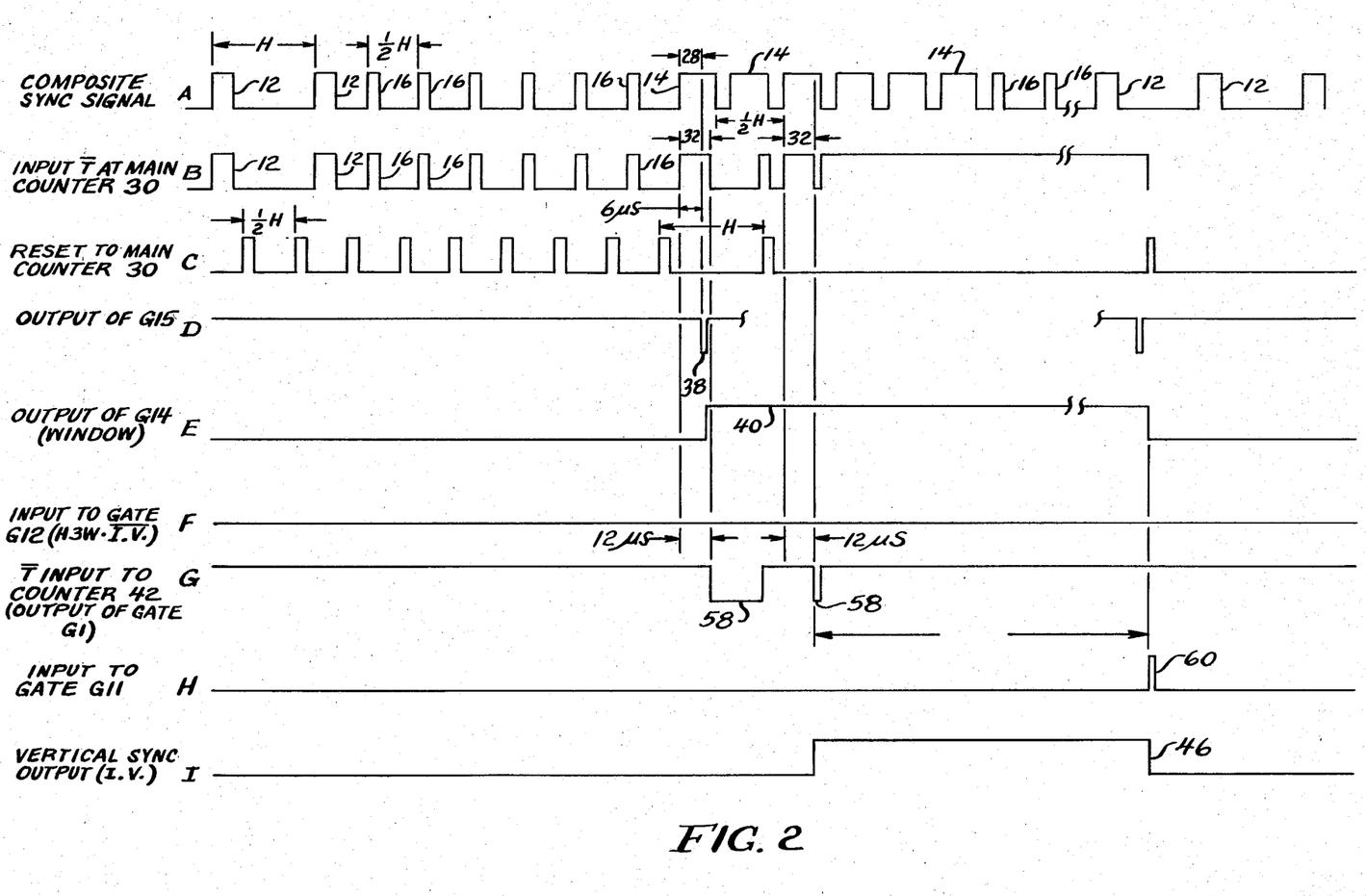
FIG. 2 is a set of waveforms representative of the input to the circuit of FIG. 1 and the resulting signals at various points in the circuit.

Referring to FIG. 2, waveform A therein schematically represents the portion of the composite sync signal of interest herein. Waveform A shows two horizontal sync pulses 12 at the left-most portion of the waveform. According to NTSC standards, the maximum width (time) of each pulses 12 is 5.1 microseconds. The time between the start of each of these pulses corresponds to one line of horizontal scanning time, which is represented in waveform A as a width H. After these two initial horizontal sync pulses 12, there are six equalizing pulses 16. It will be observed that these pulses 16 have shorter duration (smaller width) than the horizontal sync pulses. Also, they occur more frequently. Specifically, the maximum duration of an equalizing pulse according to NTSC standards is 2.5 microseconds. The rate of occurrence of such equalizing pulses in the composite sync signal is twice the horizontal scanning frequency H.

Following these six equalizing pulses, there are six broad pulses 14. These are the vertical sync pulses, which are sometimes referred to as the "serrated vertical" signal. Each of these vertical sync pulses 14 endures for at least 26.18 microseconds, and they occur at a rate of one pulse for each one-half of a horizontal line. Following the six vertical synchronizing pulses 14, there are more equalizing pulses 16, as shown, and eventually more horizontal sync pulses 12. Video information for generating the image to be viewed occurs later between horizontal sync pulses during the active picture area. The present invention is concerned with locating the vertical synchronizing pulses of waveform A and generating a consequent vertical drive pulse, referred to generally herein as an integrated vertical signal which is designated generally as "I.V."

The preferred embodiment of the present invention determines when to generate the integrated vertical pulse by seeking pulses which are long enough to qualify initially as vertical sync signals and which occur frequently enough within a predefined time window. More specifically, according to the preferred emhodiment, the system initially looks for a pulse which has a duration of at least six microseconds. Because of this initial criterion, the horizontal sync pulses (which has a time duration of only 5.1 microseconds maximally) and the equalizing pulses (which have a maximum time duration of 2.5 microseconds), cannot meet the initial qualification. The left-most vertical sync pulse 14 in waveform A (FIG. 2) will qualify by meeting the six microsecond threshhold, for the duration of each of those pulses 14 is on the order of at least 26 microseconds.

Having detected such an initial threshold condition, the preferred embodiment shifts its mode of operation and now seeks signals which are at least 12 microseconds long. If the signal received at the television receiver were perfect, and could be relied upon as always being perfect, then the preferred embodiment could theoretically look for signals which endure for 26 microseconds. However, sometimes weak signals are received or noise creates certain problems. Therefore, it has been found to be optimum in the present invention to look for pulses which have a duration of at least 12 microseconds after first finding a signal with a duration of six microseconds.

A further condition imposed by the preferred embodiment is based on the knowledge that vertical sync pulses occur twice for each horizontal line. Thus, a further requirement imposed by the preferred embodiment of the present invention is that before the system declares that vertical sync has been located, it must also find two signals each having a duration of at least twelve microseconds, and at least two occasions must occur during four horizontal line's worth of time. More specifically, the detection of a signal meeting the six microsecond criterion opens a window which endures for four horizontal lines. While this window is open, the system must find two occasions when a signal endures for at least twelve microseconds. Once these conditions are met, then the vertical drive pulse I.V. starts.

Once started, a digital counter in the preferred embodiment controls the duration of the pulse I.V. Preferably it is 451 microseconds.

The preferred embodiment of the invention utilizes a high frequency source Fc/2 to sample the composite sync signal or to operate as a timing clock for controlling the duration of the vertical drive pulse. However, it is not necessary to provide an external clock for this purpose; in the preferred embodiment, one-half of the chroma subcarrier frequency (1.79 MHz) is used.

Thus, it will be seen that the preferred embodiment has three modalities. First, it looks for six microsecond pulses. Second, it looks for two twelve microsecond pulses in a particular window. Third, it emits a vertical drive pulse I.V. of carefully controlled duration. It then reconfigures itself again to prepare for the next interaction. All of this is achieved with only three counters and only sixteen gates in the circuit of FIG. 1.

Figure 1:
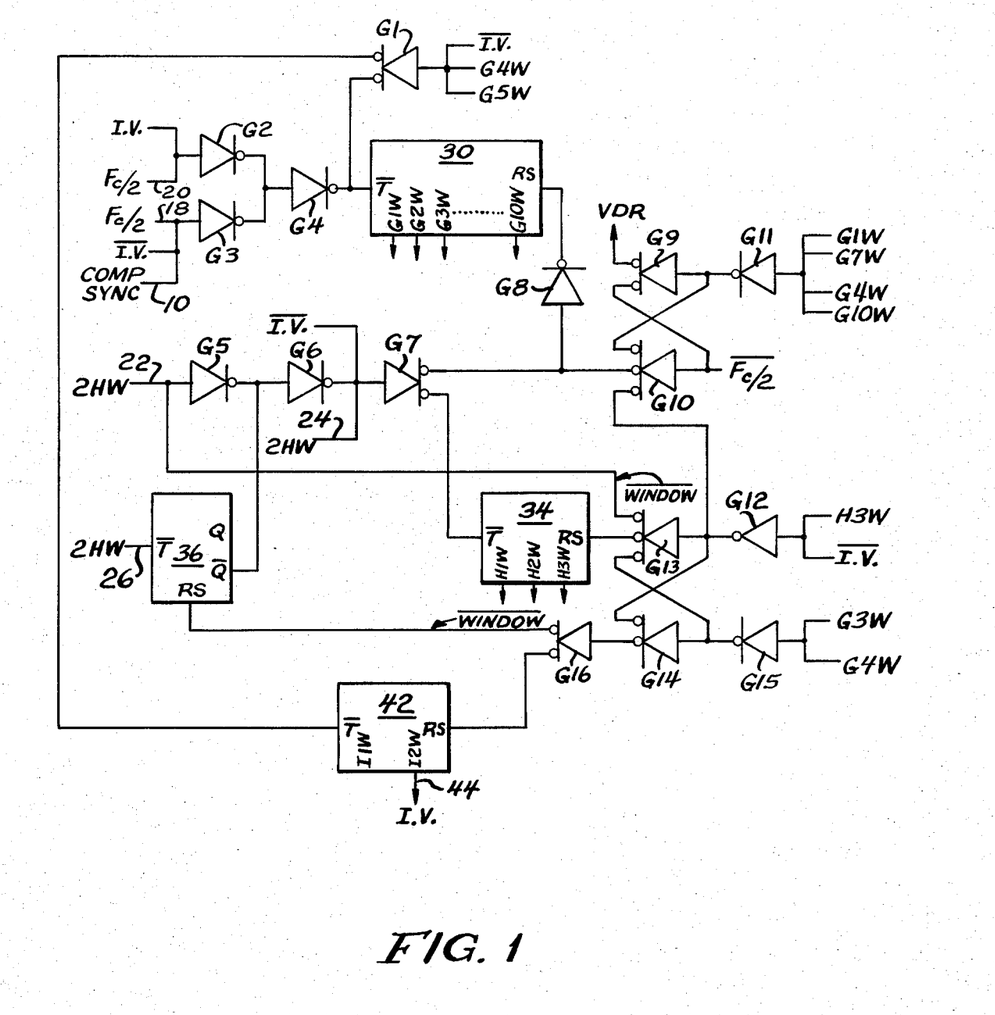
FIG. 1 is a schematic logic diagram showing one embodiment of the present invention.

FIG. 1 shows a detailed schematic diagram of the preferred embodiment of the digital vertical sync filter of the invention. As illustrated, the composite sync signal from the video transmitter (waveform A) is received on line 10 as an input to the filter circuit. Typically, the invention would be used in conjunction with the remaining circuitry of a video receiver. The appropriate interconnections with such circuitry are not shown in FIG. 1 and are readily apparent to one skilled in the art and could vary depending on the particular receiver circuitry. Consequently, they will not be described in detail herein. As shown, the circuit uses integrated injection logic, but clearly can be implemented using other logic. The circuit of FIG. 1 receives the composite sync signal as an input on line 10. Also, two external frequencies are received by the circuit: Fc/2 (one half the subchroma frequency) is received on lines 18 and 20, and 2HW (twice the horizontal sweep frequency) is received on lines 22, 24, and 26.

By way of a specific overview of the operation of FIG. 1, logic coupled to the input of a counter 30 performs the sampling of the composite sync. When counter 30 reaches a state which corresponds to six microseconds, then its outputs G3W and G4W are both high. This condition turns on gate G15 shown at the bottom right portion of FIG. 1. This should be the beginning of the vertical sync period. The preferred embodiment now looks for two occasions of twelve microseconds of a high signal in a four line window. The four line window is initiated by detection of the six microsecond signal, and the four line window is measured by counter 34. Gate G1 at the top center of FIG. 1 detects the twelve microsecond periods. Each time such a twelve microsecond signal is detected, counter 42 is toggled. If counter 42 is toggled twice during the window, this confirms the vertical sync. The vertical drive pulse, also called the integrated vertical signal, I.V. will now be outputted by counter 42. It stays on until the reset of counter 42 is disabled by counter 30 and other logic. The presence of the integrated vertical I.V. configures the input logic to counter 30 so that one-half Fc is inputted to counter 30 which then counts such pulses until 7.1 horizontal lines transpire. This terminates the vertical drive pulse I.V.

Given this specific overview, the detailed operation of this circuit can now be related. Initially, the circuit samples the incoming composite sync signal on line 10 to detect a pulse period of sufficient duration which would indicate the beginning of the vertical sync information period. In the preferred embodiment, this means that the FIG. 1 circuit looks for a pulse period which is high for at least six microseconds within a larger period corresponding to one half of the horizontal line period.

This is accomplished by sampling the composite sync signal on line 10 with the high frequency signal on line 18 through gates G3 and G4. A main counter 30 then counts the resulting high frequency samples (shown by waveform B in FIG. 2) and outputs a representative count on its outputs G1W, G2W, through G10W (lowest order to highest order). Two of these outputs, G3W and G4W, are tied to a testing gate G15 (at the bottom right part of FIG. 1) which decodes the number of high sampled pulses corresponding to six microseconds. To keep counter 30 from accumulating a count over too long a period, it is reset at a rate 2H (shown by waveform C in FIG. 2) by gates G5, G6, G7 and G8 from the 2HW input on lines 22 and 24. Thus, gate G15 can decode the six microsecond condition only if counter 30 accumulates the representative count before it is reset, which occurs twice per horizontal line period H. When gate G15 decodes the six microsecond condition, it emits a pulse 38 shown in waveform D (FIG. 2). Once main counter 30 is reset, it merely starts counting sampled high pulses again as long as a vertical drive pulse is not being generated.

Once the six microsecond count is accumulated by counter 30 and decoded by G15, the circuit "knows" logically that the vertical sync period has been found and reconditions itself in response to pulse 38 to determine whether this is a true vertical sync period requiring the generation of a vertical drive pulse at the circuit output. To satisfy this additional test criterion, the circuit now samples the incoming composite sync to confirm the presence of the longer-enduring, multiple pulses of the vertical sync period. In the preferred embodiment, the circuit detects a pulse period 32 (waveform B, FIG. 2) which is high for at least twelve microseconds within a larger period corresponding to the horizontal line period. Additionally, the circuit waits until it recognizes two such qualifing pulse periods 32 before identifying the vertical sync.

In FIG. 1, gate G15 decodes the six microsecond high signal. Gate G15 opens a time window and latches it in gates G13 and G14. The window is illustrated as waveform E in FIG. 2. It stays open until the flip-flop formed by gates G13 and G14 is toggled, and this occurs four horizontal lines later if there is no detection of a twelve microsecond pulse or at the close of the integrated vertical signal I.V. The flip-flop formed by G13 and G14 releases the reset on a counter 34. A gate G16 releases the reset on a flip-flop 36.

By releasing the latter, the reset rate of main counter 30 is slowed from 2H to H through the toggling of flip-flop 36 in response to the 2HW input on line 26 in conjunction with gates G6, G7, and G8. This is illustrated by the succeeding waveforms of FIG. 3 which will be discussed in more detail below. Thus, main counter 30 counts high, sampled composite sync pulses at its input from gates G3 and G4 and accumulates on its outputs G1W through G10W for a period corresponding to one horizontal line period at the end of which it is reset and starts accumulating again. Thus, in this mode of operation, counter 30 accumulates, for each period H, the high frequency samples which are at a high level.

Figure 3:
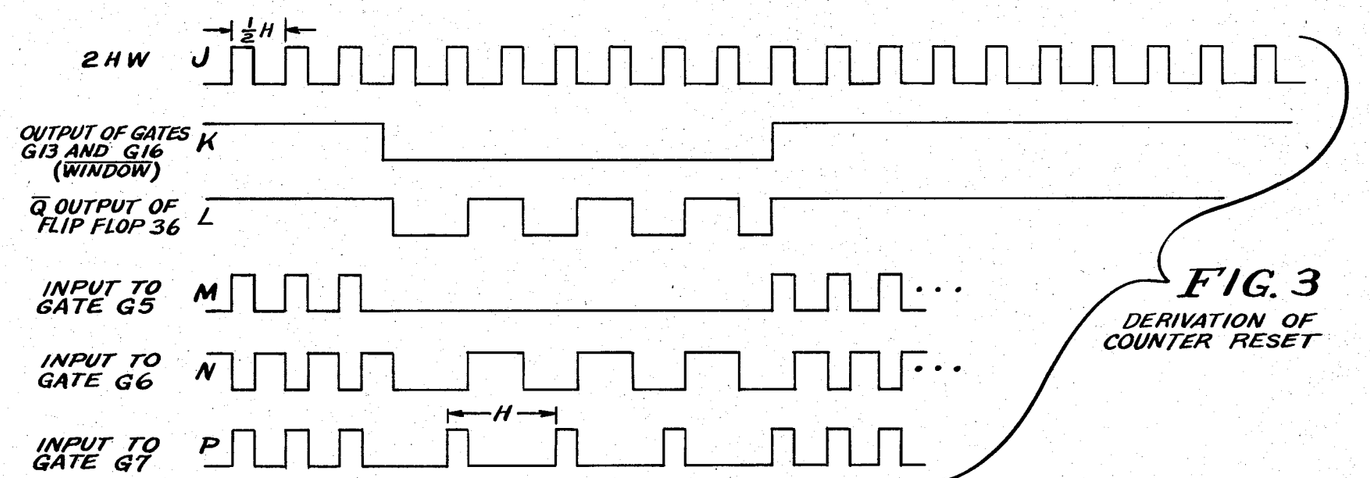
FIG. 3 is a set of waveforms which illustrate the derivation of the reset signal for the primary circuit counter from the horizontal timing input frequency.

Referring now to FIG. 3 there is shown a series of waveforms J, K, L, M, N, P which illustrate the derivation of the reset signal for main counter 30. Specifically, waveform J is the 2HW horizontal frequency signal discussed above. Waveform K is the output window from gate G16, which signal is the logical inversion of the window signal output of G14 discussed above. While this signal window endures, flip-flop 36 toggles in response to its 2HW input on line 26 and develops an output signal (waveform L) at its not Q output which is the controlling input to gate G6 during the window period. The 2HW input on line 22 to gate G5 is clamped low by the signal window from gate G13, as shown in waveform M. Gate G7, which generates the reset signal for main counter 30, receives the logical AND result of the combination of 2HW on line 24, the logical inversion $\overline{I.V.}$ of the integrated vertical pulse (I.V.), and the output of gate G6 which is the logical inversion of waveform N. As long as signal I.V. is not present at the system output, the input to gate G7 (waveform P) is normally representative of the reset signal for main counter 30. Hence, from an examination of FIG. 3 and specifically waveform P, it will be apparent that the reset rate for main counter 30 changes from 2H to H once the window signal 40 appears which indicates detection of the six microsecond period.

Once the integrated vertical signal I.V. is being generated at the system output 44, waveform P is no longer representative of the reset to main counter 30. During the period of the integrated vertical signal I.V., signals from gate G7 which would otherwise reset main counter 30 are blocked at gate G7 by I.V. signals. Reset occurs through the action of gate G10 after 7.1 horizontal lines as will be more fully described below. Waveform C of FIG. 2 illustrates the reset signal for main counter 30 as it starts at the 2H rate while looking for a 6 microsecond high signal, switches to the H rate upon detecting the 6 microsecond high signal when the window opens, is disabled following the detection of a second pulse period 32 of at least twelve microsecond duration in another horizontal period H <u>during</u> the window, and then resets at the close of the I.V. signal 451 microseconds (7.1 horizontal lines) after I.V. began.

Returning now to the period immediately following the detection of the six microsecond period, the circuit of FIG. 1 is no longer looking for such a period. In fact decoder gate G15 is operationally removed from the circuit by the tying actions of G14 and G13. Rather, the circuit is now looking for a twelve microsecond period which is decoded by a gate G1 which is tied at its input to outputs G4W and G5W of main counter 30. Decoder gate G1 serves to output a signal only when the twelve microsecond period is represented across its input. When such a period is detected, gate G1 toggles counter 42 and disables the $\overline{T}$ input to counter 30 until counter 30 is reset. This latter function keeps the circuit from shortcutting the above-described test criteria by identifying a vertical sync period when it is merely counting twelve microsecond multiples within a single horizontal line period. It is only when the necessary twelve microsecond period occurs in two distinct horizontal line periods that the vertical sync period is to be identified. It will be seen that the signal I.V. inputted to gate G1 serves to enable and disable the gate. During this step, gate G1 is not disabled.

Once the circuit has detected one of the twelve microsecond periods and toggled counter 42, it continues to sample the composite sync signal as before until it recognizes another twelve microsecond period. At such a time, counter 42 goes to a "two" state and outputs a vertical-sync identifying signal, commonly called a vertical drive pulse, also called an integrated vertical (I.V.) pulse, on line 44. This is shown as pulse 46 in waveform I of FIG. 2. In normal video receivers it is necessary that this pulse 46 should have a specific duration. Another feature of the invention provides specifically for that result, and its operation will be described thoroughly below.

As mentioned, video receivers are frequently operated in electronically noisy environments which can create extraneous pulses of various durations in the composite sync signal. Another feature of the present invention provides for noise immunity effectively to eliminate the generation of false vertical drive pulses.

This is done compatibly with the circuit described above and is triggered by the same six microsecond decode of gate G15. The effect of this is to impose a time window requirement upon the subsequent identification of the twelve microsecond pulse periods. That is, not only must there be two such periods 32, each occurring within separate horizontal line periods, but both of these twelve microsecond periods 32 must occur within a predetermined time window 40 following the initial detection of the six microsecond period 28. In the preferred embodiment, this time window corresponds to four horizontal line periods.

Operationally, this noise immunity requirement is imposed by gates G15, G14, G13, and G12 along with counter 34 and reset gate chain G7, G6, and G5. Initially, when gate G15 decodes the first six microsecond period as described above, its output pulse 38 (waveform D) disables the reset of counter 34 and opens the window. Counter 34 begins to count pulses from gate G7 which are now occurring at an H rate. Counter 34 has outputs H1W, H2W, and H3W which represent the accumulated count of pulses received at an input $\overline{T}$ counter 34. Output H3W, corresponding to a representation of a four count by counter 34, is applied as an input to a decoder gate G12 having another input which receives the signal $\overline{I.V.}$ (the logical inversion of the vertical drive pulse on line 44). If counter 34 accumulates a count of four (representative of the elapsing of four horizontal line periods after detection of the initial six microsecond period) before a vertical drive pulse (representative of the detection of two twelve microsecond periods within separate horizontal line periods) appears on line 44, then gate G12 will be activated, and the time window 40 will be closed.

More particularly, the closing of the time window through the operation of gates G12, G13, G14, and G16 clamps the resets of counter 42, counter 34, and flip-flop 36 thus operationally removing them from the circuit until another of the above described six microsecond intervals 28 is decoded by gate G15. Also, main counter 30 reset rate is returned to the original reset rate of 2H, and the circuit resumes sampling for a six microsecond period in the composite sync signal as described above.

Figure 4:
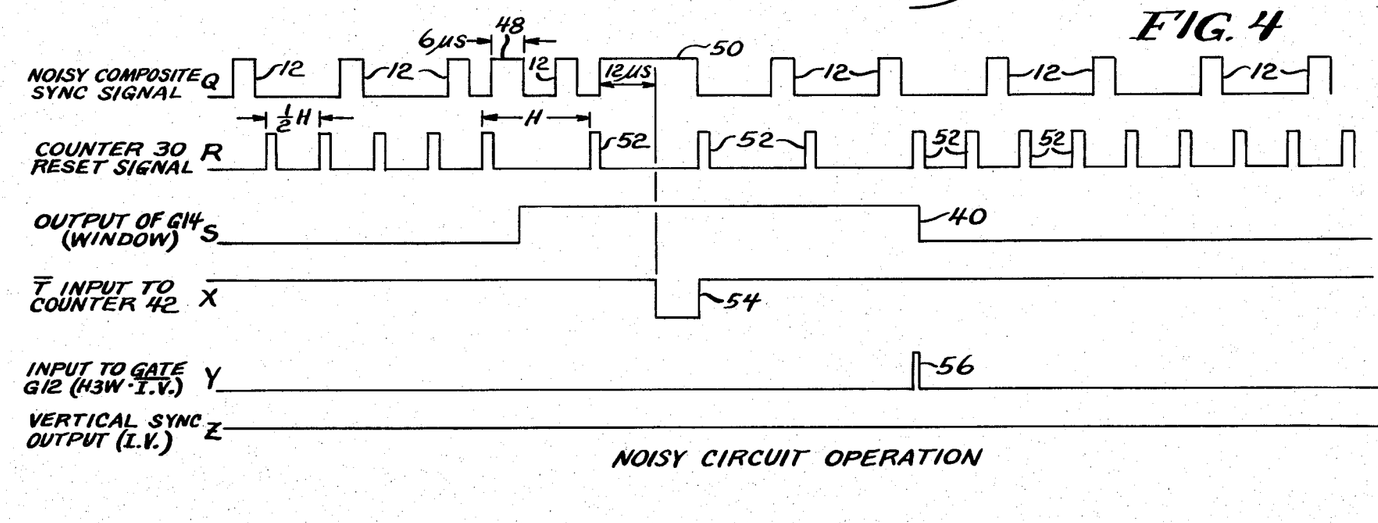
FIG. 4 is a set of waveforms illustrating the operation of the invention under noisy conditions.

Returning to FIGS. 2 and 4, which illustrate waveform representations of circuit operation under ideal and noisy conditions respectively, the advantages of the time-window noise immunity feature of the present invention can be appreciated. For example, if a six microsecond noise pulse 48 is detected in the noisy composite sync of waveform Q in FIG. 4, the circuit of FIG. 1 does not identify it as a vertical sync pulse without first testing to make sure that the succeeding portion of the composite sync signal is indeed carrying vertical sync information. As illustrated in FIG. 4, even extensive noise 50 will not cause the generation of a vertical drive pulse I.V. because the filter of FIG. 1 requires close matching with the known characteristics of the vertical sync pulses normally carried in the vertical blanking period of the composite sync signal before a vertical drive pulse is generated. Similarly, the width of the time window is sufficient to allow the normal identification of the vertical sync information, which ordinarily is contained within three horizontal line periods, yet is not so long as to allow false readings caused by noise except in extremely rare cases.

Referring to FIG. 4 specifically, a noisy composite sync signal is shown as waveform Q containing a first noise pulse 48 which is at least six microseconds long. The detection of such a pulse changes the reset rate for main counter 30 and opens a time window 40. The change in the reset rate is shown in waveform R and the time window 40 in waveform S, both in FIG. 4.

Once the circuit is reconditioned as described above, it begins to search for first and second twelve microsecond pulses. It is triggered by another noise pulse 50 in noisy composite sync signal Q. This toggles counter 42 once, as previously described and now shown as signal 54 in waveform X in FIG. 4.

However, after the window 40 is opened, counter 34 is counting reset pulses 52 (waveform R) from gate G7. When it reaches a count of four as decoded by the input to gate G12, a pulse 56 is generated at its output H3W (waveform Y) and the window 40 is closed. Consequently, the noise immunity feature has prevented the identification of the vertical sync period when all that was present in the composite sync signal was extraneous noise. Thus no integrated vertical I.V. output is generated as shown by the constant low-level signal of waveform Z in FIG. 4.

Referring again to the operation of the circuit shown by FIG. 1, another feature of the invention provides for the vertical drive pulse, once it is initiated as a response to detected vertical sync pulses, to be terminated after a precise, predetermined period so that there is little width variation in the resulting vertical drive pulse 46. In the embodiment in FIG. 1 this is accomplished again through the use of main counter 30 which serves to measure the desired period of duration for the drive pulse and provides for its termination at the end of that period.

In particular, once the vertical drive pulse 46 shown in waveform I of FIG. 2 (the integrated vertical pulse I.V.) is initiated at the output of counter 42 on line 44, gate G1 is disabled because $\overline{I.V.}$ goes low. This releases the $\overline{T}$ input to main counter 30 from the tied condition created by the detection of the second twelve microsecond period 32 as described above. Also, disabling gate G1 ties the $\overline{T}$ input of counter 42 so that it will not advance and will hold its output on line 44 constant.

Similarly, the presence of the integrated vertical signal I.V. disables gate G3 so that main counter 30 no longer receives sampled composite sync at its $\overline{T}$ input. Conversely, the integrated vertical signal (I.V.) enables gate G2 which then supplies the high frequency signal Fc/2 (one half the chroma subcarrier frequency, i.e., about 1.79 MHz) to the $\overline{T}$ input of main counter 30. This allows main counter 30 to count the high frequency pulses and represent the resulting count on its outputs G1W, G2W, . . . G10W.

However, the reset to main counter 30 is disabled when it is desired that the vertical drive pulse should last longer than one horizontal line period which corresponds to the reset period used for detecting the two twelve microsecond intervals described above. In the preferred embodiment of the invention it is desired that the vertical drive pulse I.V. last approximately four hundred fifty one microseconds which corresponds to about 7.1 horizontal line periods. To accomplish this, the reset signal to main counter 30 is disabled by disabling gate G7 through the use of the logical inversion ($\overline{I.V.}$) of the vertical drive pulse I.V.

Likewise, the time-window requirement which provides noise immunity for the circuit is disabled in the preferred embodiment. This is also accomplished simply by disabling gate G7 which decodes the elapsing of the time-window, again using the logical inversion of the vertical drive pulse. This is evident by comparing FIG. 2, waveform F (where I.V. was detected) to FIG. 4, waveform Y (where I.V. is not detected and, hence, a window closing pulse 56 is generated). Also shown in FIG. 2 is waveform G which is the output of gate G1 and the toggling input to counter 42. From this illustration it can be seen that the input to counter 42 is tied high after the second toggling pulse 58 is received indicative of the detection of a second twelve microsecond period 32 by gate G1.

With the above described counting control circuits appropriately disabled, main counter 30 counts the high frequency pulses of the chroma subcarrier frequency Fc/2 and displays that count on its outputs G1W, G2W, . . . G10W while the vertical drive pulse I.V. is being generated at the output of counter 42 on line 44. Outputs G1W, G7W, G9W, and G10W are coupled to the input of a gate G11 which decodes the desired four hundred fifty one microsecond duration of the vertical drive pulse. When main counter 30 displays a count across G1W, G7W, G9W, and G10W (representative of a four hundred fifty one microsecond period) all of the inputs to gate G11 are high (waveform H). This forces the output of gate G10 to be low. This resets counter 34 and resets counter 42 to terminate the vertical drive pulse I.V. (46) at its output on line 44. Also, when gate G11 decodes this count representing 7.1 lines, counter 30 is reset via gate G8. As is evident from the illustrated waveforms of FIG. 2 in conjunction with the above description, the resulting vertical drive pulse 46 at the circuit output 44 will have a precise duration of four hundred fifty one microseconds with very little, if any, variation. This is shown by waveforms H and I in FIG. 2. Waveform H shows pulse 60 which represents an AND function applied to all inputs to gate G11 created by counter 30 reaching the above-mentioned count on lines G1W, G7W, G9W and G10W. Integrated vertical pulse I.V. (46) of waveform I can be seen to originate once the second toggling pulse 58 is received by counter 42 and terminate when pulse 60 is generated.

At the same time that counter 42 is reset to terminate the vertical drive pulse on line 44, the circuit of FIG. 1 is electronically reconfigured to prepare for the next vertical drive pulse and begins sampling the composite sync signal to detect the initial six microsecond period described in detail above. Specifically, the reset rate for main counter 30 is again set to 2H through the action of gates G11, G9, G10, G13, G14, G16 and the resetting of flip-flop 36 when main counter 30 is initially reset after the four hundred fifty one microsecond interval by G11, G9, G10, and G8. Likewise, those gates which were previously disabled by the vertical drive pulse (causing $\overline{I.V.}$ to be low) are subsequently enabled because of its termination as described above.

Not only does the described digital vertical sync filter present a unique and novel technique for extracting vertical sync information from a composite sync signal, it also provides for enhanced noise immunity to avoid generation of false vertical drive pulses in a novel fashion. Additionally, this embodiment of the invention allows for significant cost savings through the novel use of a minimum of gates and electronic elements to accomplish the various objects of the invention.

However, it is not necessary to the operation of the invention that the circuit implementing it be that of FIG. 1. That is merely the preferred embodiment which illustrates one configuration using a low gate count. Other circuit configurations can be equally effective while using more or different gates and elements and yet would still be within the spirit and scope of the present invention.

Similarly, different elements may be used to execute particular circuit functions without escaping the scope of the present invention, e.g. substitution of a different type of logic gate than the ones shown in FIG. 1. Such substitutions would be apparent to one skilled in the art and familiar with the teachings of this application.

Likewise, differing video systems may utilize somewhat differently configured vertical sync signals or may require a different length vertical drive pulse. It is within the spirit and scope of the invention that such changes can be readily made in the circuit and would be apparent to one skilled in the art and familiar with the teachings of this application.

What is claimed is:

1. A method for extracting vertical sync information from a composite sync signal including (a) horizontal sync signals related to a horizontal frequency and having first durations and (b) vertical sync signals having second durations longer than said first durations, the method comprising the steps of:
   determining respective durations of signals within the composite sync signal;
   detecting the occurrence of a signal within said composite sync signal enduring longer than said first duration, based on said determining step; then
   detecting the occurrence of signals within said composite sync signal enduring for at least a third duration longer than said first duration, based on said determining step; then
   generating a vertical drive signal in response to said second detecting.

2. The method of claim 1 wherein said method further includes defining a time window and enabling said second-named detecting step for the duration of said time window in response to said first-named detecting step; wherein said generating step occurs if signals having at least said third duration are detected during said time window.

3. The method of claim 2 wherein said generating step does not occur if signals having at least said third duration are not detected during said time window.

4. The method of claim 2 further including counting the number of detections of signals having at least said third duration, wherein said generating step occurs only if a predetermined count of said third duration signals is reached during said time window.

5. The method of claim 1 wherein said determining step includes sampling said composite sync signal at a high frequency and applying sampled signals to a first counter; and wherein each of said detecting steps comprises decoding outputs of said first counter.

6. The method of claim 5 including resetting said first counter periodically.

7. The method of claim 6 wherein said resetting occurs initially at a rate faster than the horizontal frequency.

8. The method of claim 7 wherein said resetting occurs at a first resetting rate faster than the horizontal frequency until a first decoding of said first counter occurs corresponding to said first-named detecting step, and wherein said resetting at times thereafter occurs at a second rate slower than said first resetting rate.

9. The method of claim 5 wherein said method includes first and second decodings of said first counter corresponding to said first-named and second-named detecting steps.

10. The method of claim 9 wherein the method includes defining a time window in response to said first decoding and wherein said generating step is dependent on said second decoding occurring during said time window.

11. The method of claim 10 further including counting the number of occasions of said second decoding, and wherein said generating step is further dependent on the detection of a predetermined number of second decodings during said time window.

12. The method of claim 11 including controlling the duration of said time window by counting pulses related to the horizontal frequency.

13. The method of claim 12 including counting the number of horizontal line durations during which said second decodings occurred, and generating said vertical drive signal only if a predetermined number of horizontal line durations are counted in which said second decodings occurred.

14. A method of extracting vertical sync information from a composite sync signal having horizontal sync signals and vertical sync signals comprising:
sampling the compose sync signal at a relatively high frequency, and accumulating the respective durations of signals within said composite sync signal over periodic intervals related to the horizontal frequency;
decoding, based on said accumulating step, the occurrence of a signal enduring at least a first predetermined duration which is greater than the standard maximal duration of each of said horizontal sync signals;
in response to said decoding step, based on said accumulating step, decoding occurrences of a signal in the composite sync signal enduring at least for a second predetermined duration which is greater than said first predetermined duration but less than the minimal duration of a standard vertical sync signal;
in response to the second-named decoding step, generating a vertical drive pulse.

15. The method of claim 14 wherein said method further includes defining a time window in response to said first-named decoding step, said time window being related to the horizontal frequency; and generating said vertical drive pulse only if a predetermined number of said second-named decodings occur during said time window.

16. The method of claim 15 including resetting said accumulations at twice the horizontal frequency until said first-named decoding occurs and resetting said accumulations at the horizontal frequency in response to said first-named decoding.

17. The method of claim 14 wherein said generating step includes accumulating high frequency signals and decoding a number thereof representative of the desired duration of the vertical drive pulse, but terminating said vertical drive pulse in response to said third-named decoding.

18. Apparatus for extracting vertical sync information from a composite sync signal which includes horizontal sync signals related to a horizontal frequency and having first durations, the composite sync signal also having vertical sync signals therein having second durations longer than said first durations, the apparatus comprising:
a logic circuit for receiving the composite sync signal and for determining the durations of signals therein;
a first decoder coupled to said logic circuit for detecting the occurrence of a signal in said composite sync signal having at least a duration longer than said first duration, said logic circuit being coupled to respond to said detecting by said first decoder;
a second decoder coupled to said logic circuit for detecting the occurrence of a signal in said composite sync signal having at least a third duration longer than said first duration;
a signal generator responsively coupled to said second decoder for generating a vertical drive signal.

19. The apparatus according to claim 18 including a circuit for generating a time window and being responsively coupled to said first decoder, said signal generator being responsively coupled to said time window circuit.

20. The apparatus according to claim 19 wherein said signal generator is coupled so that it does not generate said vertical drive signal if said second decoder does not decode said signal having at least said third duration during said time window.

21. The apparatus according to claim 19 further including a second counter responsively coupled to said first decoder and being cooperatively coupled to said first-named counter.

22. The apparatus according to claim 18 wherein said logic circuit includes means for sampling the received composite sync signal at a high frequency, and a first counter having an input coupled to receive sampled composite sync signals; and wherein said first decoder is coupled to selected outputs of said counter.

23. The apparatus according to claim 22 wherein said first counter includes a reset input, and said logic circuit further includes reset means coupled to said reset input of said counter and being coupled to receive periodic signals relating to the horizontal frequency, said reset means being operative to reset said counter at a rate related to the horizontal frequency.

24. The apparatus according to claim 23 wherein said reset means is operative to reset said counter initially at a rate faster than the horizontal frequency.

25. The apparatus according to claim 24 wherein said reset means is operative to reset said counter at a first rate faster than the horizontal frequency, said reset means being responsive to said first decoder for adjusting the rate of said resetting to a second rate slower than said first resetting rate.

26. The apparatus according to claim 22 including a circuit coupled to said first decoder, said circuit defining a time window in response to the decoding in the said first decoder of the occurrence of said signal in said composite sync signal having a duration longer than said first duration, wherein said signal generator is coupled so that it does not generate said vertical drive signal unless said second decoder detects the occurrence of said signal in the composite sync signal having at least said third duration during said time window.

27. The apparatus according to claim 26 further including a second counter and wherein said first counter is responsively coupled to said second counter.

28. The apparatus according to claim 27 including control means coupled to an input of said second counter for controlling the duration of said time window by counting a predetermined number of pulses related to the horizontal frequency.

29. The apparatus according to claim 28 wherein said signal generator includes means for counting the number of times which said second decoder performs a decoding, and wherein said signal generator is operative so that said vertical drive signal is generated only if a predetermined number of second decodings is counted.

30. Apparatus for extracting vertical sync information from a composite sync signal having horizontal sync signals therein related to a horizontal frequency and having first durations, the composite sync signal also including vertical sync signals having second durations longer than said first durations, the apparatus comprising:
 a circuit for sampling the composite sync signal at a relatively high frequency;
 first accumulating means responsive to said sampling circuits for accumulating the duration of signals within said composite sync signal, said accumulation means being arranged to accumulate said durations over periodic intervals related to the horizontal frequency;
 a first decoder responsively coupled to said accumulation means for decoding the occurrence of a signal in the composite sync signal enduring for at least a first predetermined duration which is greater than the standard maximal duration of each of the horizontal sync signals, said accumulating means being responsively coupled to said first decoder;
 a second decoder responsively coupled to said accumulating means for decoding occurrence of a signal in the composite sync signal enduring for at least a second predetermined duration which is greater than said first predetermined duration but less than the minimal duration of a standard vertical sync signal in the composite sync signal;
 a signal generator responsively coupled to said second decoder for generating a vertical drive pulse.

31. The apparatus according to claim 30 further including means for generating a time window, said means being responsively coupled to said first decoder, said means being connected to a source of signals related to the horizontal frequency, said time window being related to the horizontal frequency; said signal generator including second accumulating means for accumulating a predetermined number of decodings by said second decoder, said signal generator being coupled to generate said vertical drive pulse after a predetermined number of said second decodings occur during the time window.

32. The apparatus according to claim 31 including resetting means for resetting said first accumulating means at twice the horizontal frequency, said resetting means being coupled to said first decoder and being responsive thereto for adjusting the rate of resetting in response to a first decoding so that resetting occurs at the horizontal frequency.

33. The apparatus according to claim 30 further including a third decoder coupled to said first accumulating means, said signal generator being responsively coupled to said third decoder for terminating said vertical drive pulse in response to the decoding of a signal by said third decoder.

34. In a video system utilizing a composite sync signal including a first period of horizontal sync information and a second period of vertical sync information, a method for extracting said vertical sync information comprising:
 sensing the initiation of said vertical sync period by sensing a signal which endures longer than a prescribed maximum duration of a horizontal sync signal;
 testing to determine whether said vertical sync period continues by testing for the presence of a predetermined number of signals occurring after said first-named sensing and within a predetermined time window initiated by said first sensing step and related to the horizontal frequency of the video system; and
 generating a representative pulse if said test indicates vertical sync information.

35. The apparatus of claim 18 wherein said logic circuit includes
 a first sensing circuit coupled to receive said composite sync signal for sensing pulses of at least a second duration greater than said first duration;
 said sensing circuit being electrically reconfigured to form a part of a second sensing circuit for sensing pulses of at least a third duration longer than said second duration; and
 a counting circuit coupled to said second sensing circuit for counting a plurality of said pulses of said third duration.

36. A digital vertical sync filter for receiving a composite sync signal and for generating a vertical drive signal comprising:
 a first counter and an input circuit coupled to sample the composite sync signal and to generate a count representing the duration of signals in the composite sync signal;
 first and second decoders coupled to said first counter;
 a reset circuit coupled to said counter and said first decoder; said reset circuit including a second counter and arranged to generate a time window in response to said first decoder; and
 a signal generator circuit responsively coupled to said second decoder.

* * * * *